United States Patent
Ogle et al.

(10) Patent No.: US 10,602,196 B2
(45) Date of Patent: *Mar. 24, 2020

(54) SET-TOP BOX, SYSTEM AND METHOD FOR PROVIDING AWARENESS IN A HOSPITALITY ENVIRONMENT

(71) Applicant: Enseo, Inc., Richardson, TX (US)

(72) Inventors: Vanessa Ogle, Fairview, TX (US); Thomas R. Miller, Plano, TX (US); William C. Fang, Plano, TX (US)

(73) Assignee: Enseo, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,783

(22) Filed: Nov. 27, 2018

(65) Prior Publication Data

US 2019/0098340 A1    Mar. 28, 2019

Related U.S. Application Data

(63) Continuation of application No. 15/652,622, filed on Jul. 18, 2017, now Pat. No. 10,142,662, which is a
(Continued)

(51) Int. Cl.
| | |
|---|---|
| *H04N 7/18* | (2006.01) |
| *H04N 21/214* | (2011.01) |
| *H04N 21/4363* | (2011.01) |
| *H04N 21/258* | (2011.01) |
| *H04N 21/434* | (2011.01) |

(Continued)

(52) U.S. Cl.
CPC ........... *H04N 21/2143* (2013.01); *G07C 1/00* (2013.01); *H04N 21/23605* (2013.01); *H04N 21/25841* (2013.01); *H04N 21/414* (2013.01); *H04N 21/4108* (2013.01); *H04N 21/42221* (2013.01); *H04N 21/4343* (2013.01); *H04N 21/43637* (2013.01); *H04N 21/4516* (2013.01); *H04N 21/4524* (2013.01); *H04W 84/12* (2013.01)

(58) Field of Classification Search
CPC ......... H04N 21/4516; H04N 21/43637; H04N 21/2143; H04N 21/25841; H04N 21/4343; H04N 21/4524; H04N 21/4108; H04N 21/414; H04N 21/42221; H04N 21/23605

See application file for complete search history.

(56) References Cited

U.S. PATENT DOCUMENTS

| | | |
|---|---|---|
| 9,332,304 B2 | 5/2016 | Ogle et al. |
| 9,344,757 B2 | 5/2016 | Ogle et al. |

(Continued)

*Primary Examiner* — Yassin Alata

(74) *Attorney, Agent, or Firm* — Scott T. Griggs; Griggs Bergen LLP

(57) ABSTRACT

A system and method for providing awareness in a hospitality environment are presented. In one embodiment, a vertical and horizontal array of set-top boxes is provided and each set-top box includes an identification corresponding to the room in which the set-top box is placed. Each set-top box includes a wireless transceiver that periodically transmits an identification beacon that is received by a proximate wireless-enabled interactive device. The proximate wireless-enabled interactive device, in turn, broadcasts data packets including an indication of the strength of set-top box identification signals received. The broadcasts are received by a server via an array of wireless routers. The location of the proximate wireless-enabled interactive device is determined based on the signal strength information in the data packets.

20 Claims, 5 Drawing Sheets

Related U.S. Application Data continuation of application No. 15/165,851, filed on May 26, 2016, now Pat. No. 9,712,872, which is a continuation of application No. 14/461,479, filed on Aug. 18, 2014, now Pat. No. 9,357,254.

(60) Provisional application No. 61/935,862, filed on Feb. 5, 2014.

(51) Int. Cl.
| | |
|---|---|
| *H04N 21/45* | (2011.01) |
| *G07C 1/00* | (2006.01) |
| *H04N 21/41* | (2011.01) |
| *H04N 21/414* | (2011.01) |
| *H04N 21/422* | (2011.01) |
| *H04N 21/236* | (2011.01) |
| *H04W 84/12* | (2009.01) |

(56) References Cited

U.S. PATENT DOCUMENTS

| | | |
|---|---|---|
| 9,357,254 B2 | 5/2016 | Ogle et al. |
| 9,712,872 B2 | 7/2017 | Ogle et al. |
| 10,142,662 B2 | 11/2018 | Ogle et al. |
| 2011/0099575 A1 | 4/2011 | Woo et al. |
| 2017/0318341 A1 | 11/2017 | Ogle et al. |

SET-TOP BOX, SYSTEM AND METHOD FOR PROVIDING AWARENESS IN A HOSPITALITY ENVIRONMENT

PRIORITY STATEMENT & CROSS-REFERENCE TO RELATED APPLICATIONS

This application is a continuation of U.S. application Ser. No. 15/652,622 entitled "Set-Top Box, System and Method for Providing Awareness in a Hospitality Environment" filed on Jul. 18, 2017, in the names of Vanessa Ogle et al., now U.S. Pat. No. 10,142,662 issued on Nov. 27, 2018; which is a continuation of U.S. patent application Ser. No. 15/165,851 entitled "Set-Top Box, System and Method for Providing Awareness in a Hospitality Environment" filed on May 26, 2016, in the names of Vanessa Ogle et al., now U.S. Pat. No. 9,712,872 issued on Jul. 18, 2017; which is a continuation of U.S. patent application Ser. No. 14/461,479 entitled "Set-Top Box, System and Method for Providing Awareness in a Hospitality Environment" filed on Aug. 18, 2014, in the names of Vanessa Ogle et al., now U.S. Pat. No. 9,357,254 issued on May 31, 2016; which claims priority from U.S. Patent Application Ser. No. 61/935,862 entitled "System and Method for Providing Awareness in a Hospitality Environment" and filed on Feb. 5, 2014, in the name of Vanessa Ogle; all of which are hereby incorporated by reference for all purposes.

TECHNICAL FIELD OF THE INVENTION

This invention relates, in general, to remote control devices and, in particular, to set-top/back boxes as well as systems and methods for providing awareness in a hospitality environment, such as a lodging establishment, motel, or hotel, for example.

BACKGROUND OF THE INVENTION

Without limiting the scope of the present invention, the background will be described in relation to employee safety in hospitality environments, as an example. Employees face increased personal security risks at work in hospitality environments, such as lodging establishments, motels, and hotels, for example. Such hospitality industry employees often work alone and range over large interior areas that may be divided into many small, closed spaces. As a result of limited existing security measures, there is a need for improved systems and methods of providing awareness and safety in hospitality environments.

SUMMARY OF THE INVENTION

It would be advantageous to achieve awareness in hospitality environments that would decrease personal security risks to workers. It would also be desirable to enable a wireless-based solution that would mitigate or eliminate the cost of providing increased security in lodging establishments, such as a motel, or hotel, for example. More generally, it would be desirable to enable such a solution for any multi-unit environment including hospitality environments, educational campuses, hospital campuses, office buildings, multi-unit dwellings, sport facilities and shopping malls, whether a single story, multiple stories, or a combination thereof. To better address one or more of these concerns, systems and methods, including a set-top box, are disclosed for providing awareness in hospitality environments. In one embodiment of the system, a vertical and horizontal array of set-top boxes is provided and each set-top box includes an identification corresponding to the room in which the set-top box is placed. Each set-top box includes a wireless transceiver that periodically transmits an identification beacon that is received by a proximate wireless-enabled interactive device. The proximate wireless-enabled interactive device, in turn, broadcasts data packets including an indication of the strength of set-top box identification signals received. The broadcasts are received by a server via an array of wireless routers. The location of the proximate wireless-enabled interactive device is determined based on the signal strength information in the data packets. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
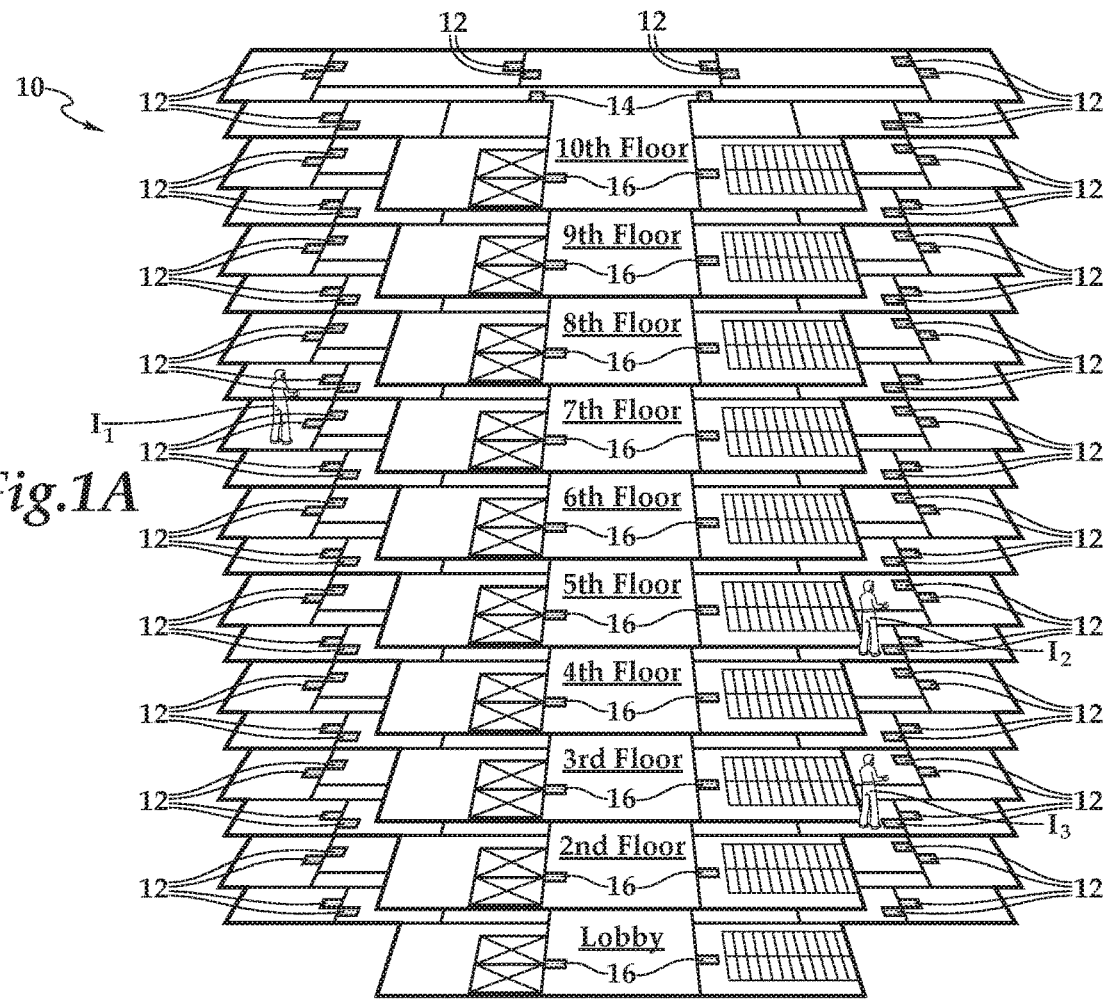
FIG. 1A is schematic building diagram depicting one embodiment of a system for providing awareness in a hospitality environment illustrated as a hotel, according to the teachings presented herein.
Figure 1B:
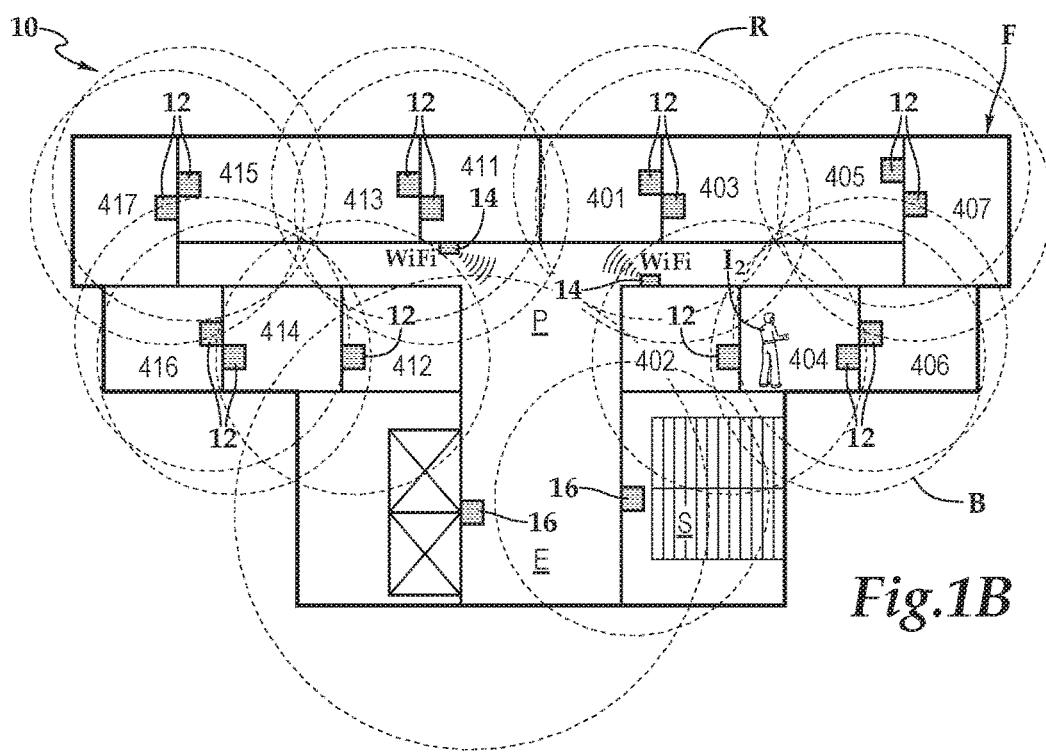
FIG. 1B is a schematic floor plan depicting a floor of the hotel presented in FIG. 1A in further detail.

Referring initially to FIGS. 1A and 1B, therein is depicted a system for providing awareness in a hospitality environment, such as a furnished multi-family residence, dormitory, lodging establishment, hotel, hospital, or other multi-unit environment which is schematically illustrated and designated 10. More generally, the system 10 and the teachings presented herein are applicable to any multi-unit environment including hospitality environments, educational campuses, hospital campuses, office buildings, multi-unit dwellings, sport facilities and shopping malls.

As shown, by way of example and not by way of limitation, the hospitality environment is depicted as a hotel having a lobby and floors F, which are appropriately labeled the $2^{nd}$ floor through the $10^{th}$ floor. Further, by way of example, the $4^{th}$ floor is depicted with rooms 401, 402, 403, 404, 405, 406, 407, 411, 412, 413, 414, 415, 416, and 417. Additionally, a common area near the elevators is labeled E, a hallway labeled P, and a stairwell is labeled S.

Set-top boxes 12 are communicatively disposed with various amenities associated with the hospitality environment, which as mentioned is depicted as the hotel H. As used herein, set-top boxes include back boxes and set-top/back boxes may be discussed as set-top boxes. By way of example, each set-top box 12 may be a set-top unit that is an information appliance device that generally contains a TV-tuner input connected to an external source of content and a television output connected to a television set. The set-top box tunes the source signal into content in a form that can then be displayed on the television screen or other display device. Such set-top boxes are used in cable television, satellite television, and over-the-air television systems, as well as other uses, such as, an informational appliance coupled to various hospitality suites of service provided by the hotel H, including, for example, check in/check out, maid service, spa, room service, and front desk. As shown, each room includes a set-top box 12. The set-top boxes are deployed as part of a horizontal and vertical array, which is generally a spatial array, throughout the hotel H. It should be appreciated, however, that the set-top boxes and more generally deployment of the system may include a horizontal array. Further, the deployment may be in a single story, multiple stories, or a combination thereof.

Each of the set-top boxes 12 emits a beacon, which is illustrated as field B, for identifying itself to detecting programmable devices, as will be discussed hereinbelow. In the aforementioned common areas, including the elevators E, the hallway P, and stairwell S, beacon devices 16 are depicted that emit fields B for identifying themselves to the programmable devices also. Wireless routers 14 are deployed as part of a horizontal and vertical array, or more generally a spatial array, throughout the hotel H to send and receive information. As shown, the wireless routers 14 are WiFi enabled. It should be appreciated however that the wireless routers 14 may communicate via infrared (IR), 802.11, 3G, 4G, Edge, ZigBee, near field communications (NFC), or Bluetooth and Bluetooth low energy, for example.

The set-top boxes 12 and beacon devices 16, which are collectively beacons, periodically transmit beacons to the programmable devices, such as wireless-enabled programmable device 18, being utilized by individual $I_1$. The programmable device 18 may be a wireless-enabled smart and interactive handheld device that may be supplied or carried by the user or guest and may be selected from a range of existing devices, such as, for example iPads®, iPhones®, iPod Touch®, Android® devices, Blackberry® devices, and laptops. In another implementation, the programmable device 18 may be a special purpose device, including a battery powered personal locator device. As shown individual $I_1$ works in the hospitality industry at hotel H and is presently working on the $4^{th}$ floor. As the individual $I_1$ is working in room 404, the programmable device 18 is receiving beacons from the set-top box 12 that is located within the room 404. Additionally, the programmable device 18 is receiving beacons from the set-top box 12 that is located within the room 406.

Figure 1C:
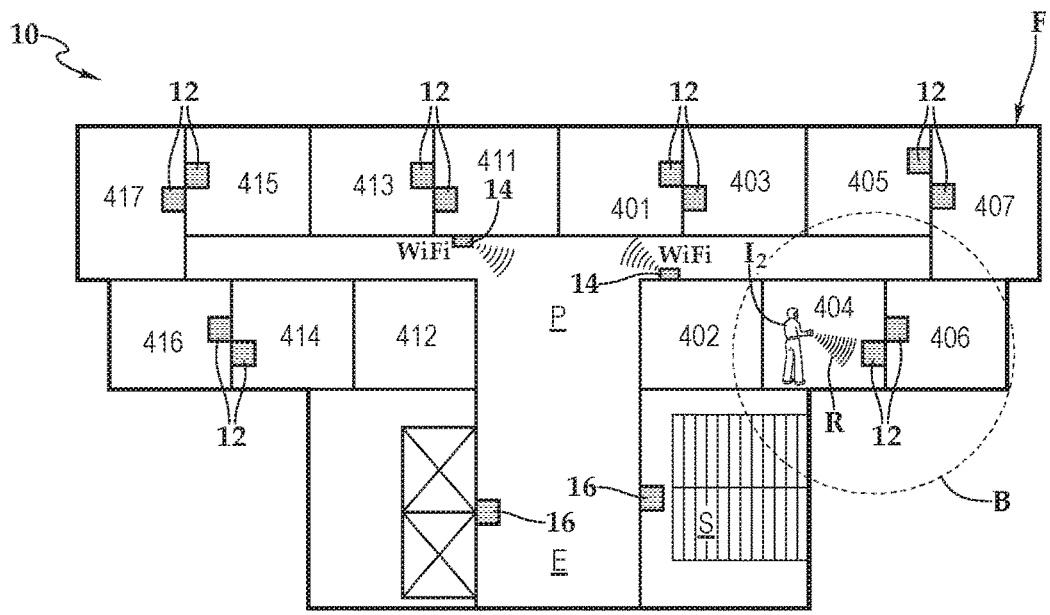
FIG. 1C is a schematic floor plan depicting a floor of the hotel presented in FIG. 1A in further detail, wherein an event requiring an alert is occurring.
Figure 2:
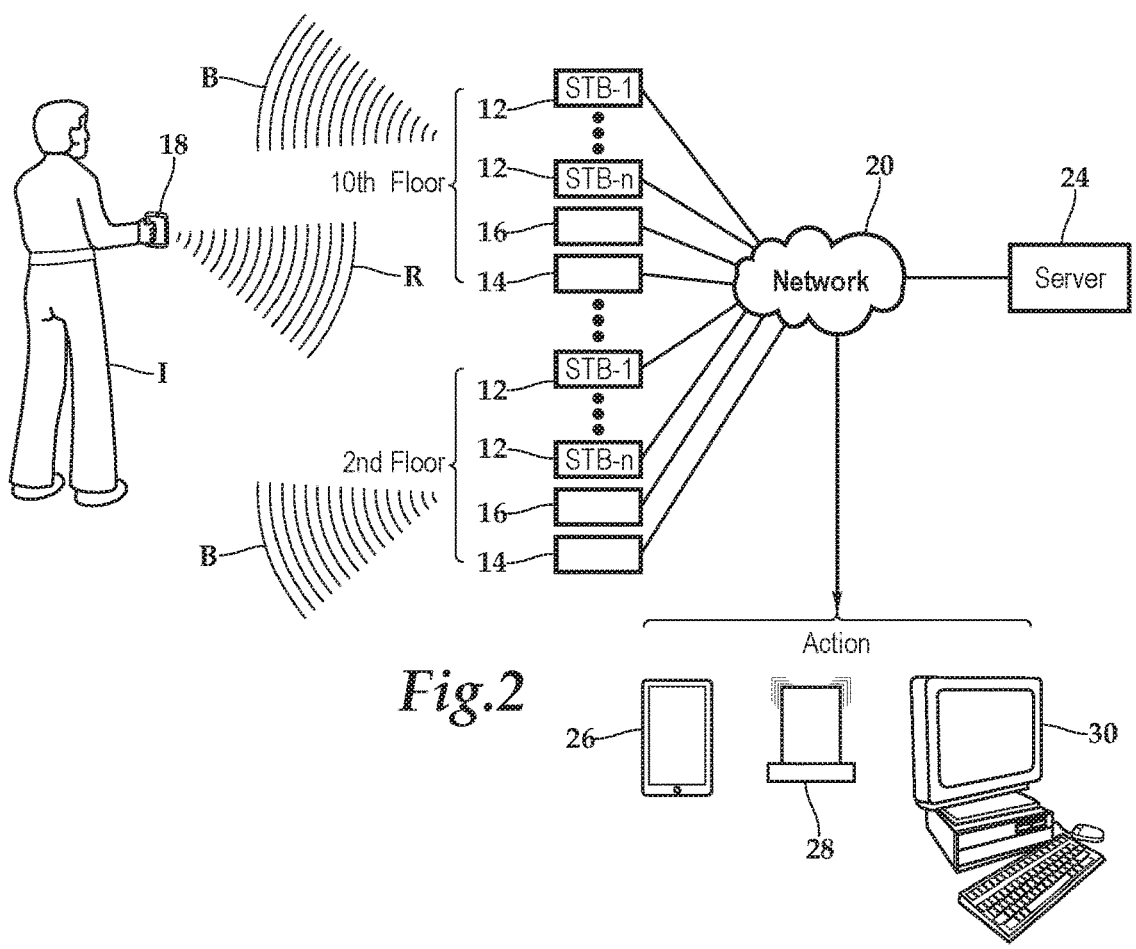
FIG. 2 is a schematic block diagram depicting one embodiment of the signal flow in the system presented in FIG. 1A.

Referring now to FIGS. 1C and 2, the individual $I_1$ having the programmable device 18, which is receiving beacons from the set-top box 12 located within the room 404 and the set-top box 12 located within the room 406, perceives danger and requires assistance and help. The individual $I_1$ activates the programmable device 18, which sends a data packet that, via the wireless routers 14 and the network 22, communicates with a server 24. The server 24, in turn, sends out the appropriate notifications to various phones 26, to activate alarms 28, or notify others via a computer, such as computer 30. As a spatial array of horizontal and vertical set-top boxes 12 and beacon devices 16 are provided, the system presented herein is able to determine the location of the individual $I_1$ within a building. The location information determined includes which floor the individual $I_1$ is presently located as well as the room or common area.

In another mode of operation, the individual $I_2$ is located on the $3^{rd}$ floor of the hotel H. This individual is within the field of several beacons, including set-top boxes and common area beacon devices. The wireless-enabled interactive device associated with the individual $I_2$ periodically broadcasts a data packet to the server 24, via the wireless routers 14 and the network 20. The location of this individual is known and the individual $I_2$ publishes the location so that others may contact this individual or find this individual. Similarly, the location of the individual $I_3$ is known to be on the $6^{th}$ floor of the hotel H. The individual uses associated wireless-enabled interactive device to report service requests to the management of the hotel H.

Figure 3:
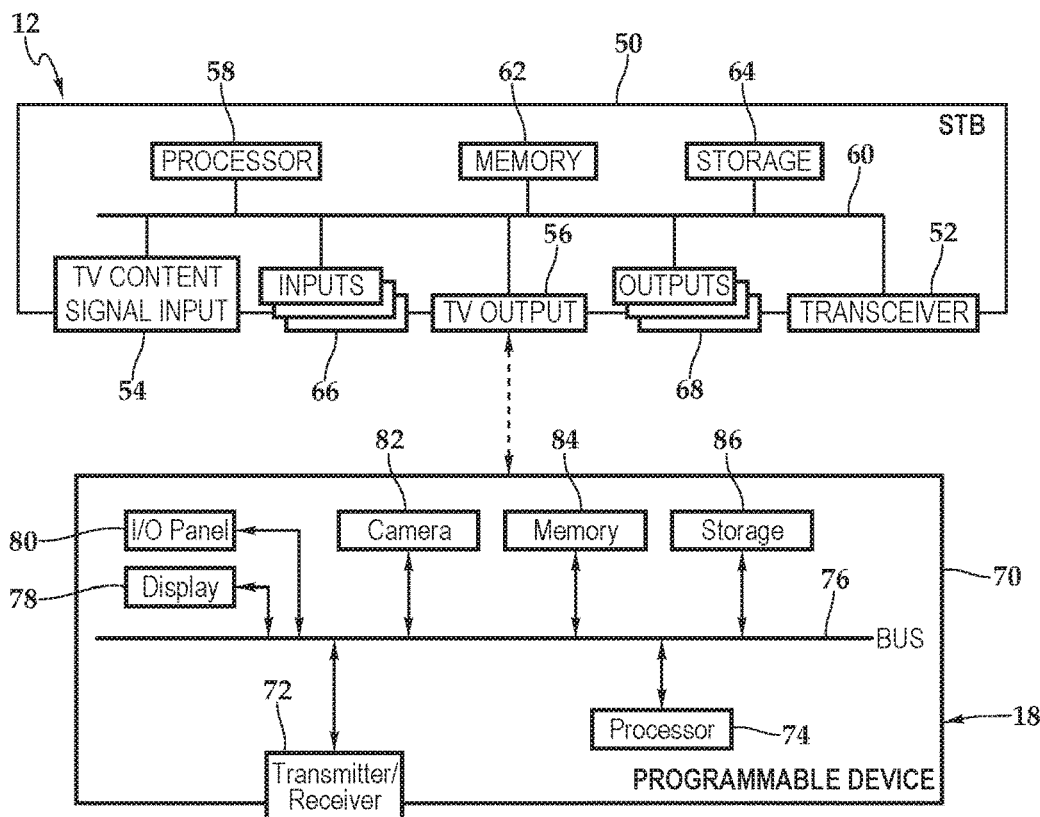
FIG. 3 is a schematic block diagram depicting one embodiment of a set-top box and one embodiment of a programmable device, both components of the system presented in FIG. 1A.

Referring now to FIG. 3, the set-top box 12 and programmable device 18 are illustrated in further detail. With regard to the set top box 12, a housing 50 includes a wireless transceiver 52 associated therewith, internally, externally or via combination thereof, in order to communicate with the programmable device 18, which, as discussed, may have the form of a proximate wireless-enabled electronic device or interactive handheld device, or battery powered transmitter, for example. Communication between the programmable device 18 and the set-top box 12 may be enabled by a variety of wireless methodologies, including 802.11, 3G, 4G, Edge, WiFi, ZigBee, near field communications (NFC), Bluetooth low energy and Bluetooth, for example. Also, infrared (IR) may be utilized. If direct communication is not possible, communication between the interactive device and the set top box may be made through indirect communication protocols. For example, a proxy service may be used to route messaging to the interactive device by way of the Internet or 802.11 communication.

A television input 54 and a television output 56 are also secured in the housing 50 in order to receive content from a source in a multi-unit environment and forward content to a television. A processor 58 located within the housing 50 is coupled to the wireless transceiver 52 and the television input 54 and the television output 56 by a bus 60 or other architecture. A memory 62 and storage 64 are accessible to the processor 58 and the memory 62 includes processor-executable instructions that, when executed, cause the processor to execute a series of operations. Other inputs 66 and outputs 68 may be associated with the set-top box 12 as well.

The processor-executable instructions periodically transmit an identification signal including set-top box identification that may be received by a proximate wireless-enabled interactive handheld device. As previously discussed, the programmable device 18 may include an application, which assists in the receiving, or alternatively a NFC protocol may be utilized to facilitate the receiving of the identification. In many embodiments of the beacon methodology, physical proximity between the programmable device 18 and the set-top box 12 is leveraged to establish signaling therebetween.

The programmable device 18 may be a wireless communication device of the type including various fixed, mobile, and/or portable devices. To expand rather the limit the previous discussion of the programmable device 18, such devices may include, but are not limited to, cellular or mobile telephones, two-way radios, personal digital assistants, digital music players, Global Position System units, and so forth. The programmable device 18 may include a transmitter/receiver 72, processor 74, bus 76, display 78, I/O panel 80, a camera 82, memory 84, and storage 86. It should be appreciated that although a particular architecture is explained, other designs and layouts are within the teachings presented herein.

In operation, the teachings presented herein permit a programmable device 18 such as a smart phone or simple transmitter to communicate with a set-top box that is able to relay an alert with location to a main server and security or other individuals needing to know about the emergency. In the operation embodiment being described, the programmable device 18 may be "paired" on a temporary basis to the set top/back box on a room-by-room basis, whereby the pairing changes as the hospitality employees location changes, thereby changing the strongest received signal.

As shown, the programmable device 18 includes the memory 84 accessible to the processor 74 and the memory 84 includes processor-executable instructions that, when executed, cause the processor to receive set-top box identification beacon signals and measure the strength of the identification beacon signals. The programmable device 18 then periodically transmits a broadcast signal including a data packet having at least one set-top box identification, a corresponding signal strength identification indicating the strength of the set-top box identification beacon signal, and a proximate wireless-enabled interactive device identification.

Figure 4:
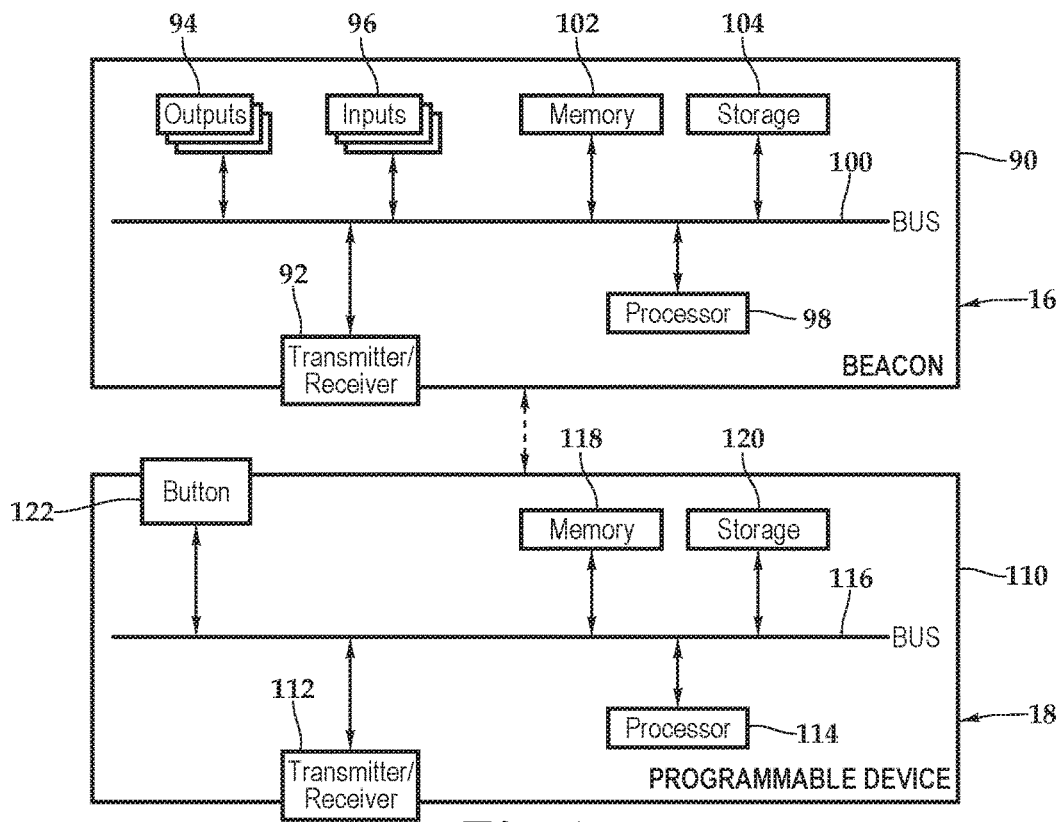
FIG. 4 is a schematic block diagram depicting one embodiment of a beacon and another embodiment of a programmable device, both components of the system presented in FIG. 1A.

Referring now to FIG. 4, a beacon 16 and a simplified programmable device 18 are shown. With respect to the beacon 16, a housing 90 protects a transmitter/receiver 92, outputs 94, inputs 96, processor 98, bus 100, memory 102 and storage 104. The memory 102 is accessible to the processor 98, and the memory 102 includes processor-executable instructions that, when executed, cause the processor 98 to periodically transmit, via the transmitter/receiver 92, an identification beacon signal including beacon device identification.

With respect to the simplified programmable device 18, a housing 110 protects a transmitter/receiver 112, processor 114, bus 116, memory 118 and storage 120. A button 122 provides the activation that triggers the alert. As shown, the programmable device 18 includes the memory 118 accessible to the processor 114 and the memory 118 includes processor-executable instructions that, when executed, cause the processor to receive set-top box identification beacon signals and measure the strength of the identification beacon signals. The programmable device 18 then periodically transmits a broadcast signal including a data packet having at least one set-top box identification, a corresponding signal strength identification indicating the strength of the set-top box identification beacon signal, and a proximate wireless-enabled interactive device identification. Responsive to the activation of the emergency button, the programmable device 18 immediately transmits a broadcast signal including a data packet having at least one set-top box identification, a corresponding signal strength identification indicating the strength of the set-top box identification beacon signal, a proximate wireless-enabled interactive device identification, and an emergency alert.

Figure 5:
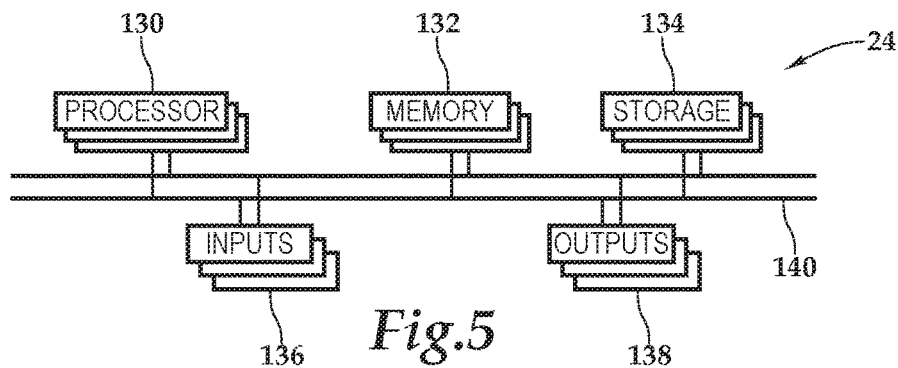
FIG. 5 is a schematic block diagram depicting one embodiment of a server, a component of the system presented in FIG. 2.

Referring to FIG. 5, one embodiment of the server 24 as a computing device includes a processor 130, memory 132, storage 134, inputs 136, and outputs 138 interconnected with various buses 140 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 130 may process instructions for execution within the server 24, including instructions stored in the memory 132 or in storage 134. The memory 132 stores information within the computing device. In one implementation, the memory 132 is a volatile memory unit or units. In another implementation, the memory 132 is a non-volatile memory unit or units. Storage 134 includes capacity that is capable of providing mass storage for the server 24. Various inputs 136 and outputs 138 provide connections to and from the server 24, wherein the inputs 136 are the signals or data received by the server 24, and the outputs 138 are the signals or data sent from the server 24.

The memory 132 is accessible to the processor and 130 and includes processor-executable instructions that, when executed, cause the processor 130 to execute a series of operations. The processor-executable instructions receive the data packet from the proximate wireless-enabled interactive device and process the data packet to determine the set-top box/beacon device or, more generally, beacon identification of strongest signal strength and the proximate wireless-enabled interactive device identification. Based on this analysis, the instructions determine the location of the proximate wireless-enabled interactive device as being proximate to the set-to box or beacon device of strongest signal strength. Depending on the configuration of the wireless-enabled interactive device, the processor-executable instructions update a database with the location and timestamp of the proximate wireless-enabled interactive device. Further, the processor-executable instructions may transmit a service request relative to the wireless-enabled interactive device, publish the location of the wireless-enabled interactive device, or execute an emergency alert or alarm.

Figure 6A:
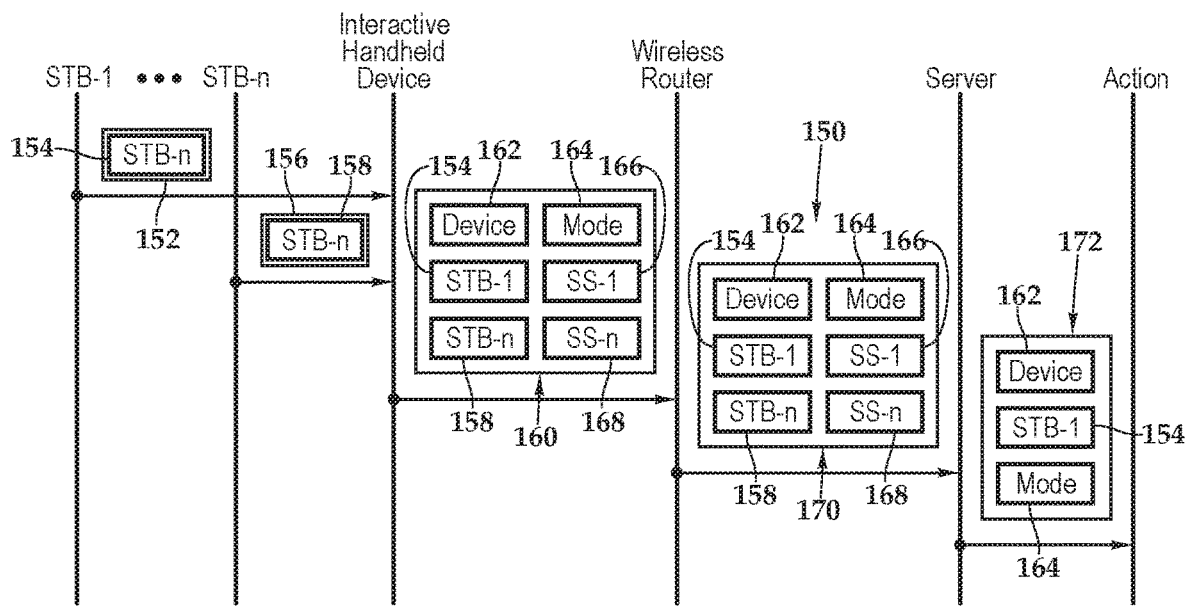
FIG. 6A is a signal flow diagram depicting one embodiment of signalization and data transfer within the system presented in FIG. 1A.

FIG. 6A illustrates one embodiment of signalization and data transfer 150. As shown, set-top boxes 1 through n respectively transfer data packet 152 including beacon identification 154 and data packet 156 including beacon identification 156. The data packets 152, 156 are received by an interactive handheld device, which determines the signal strength of each received data packet 152, 156. The interactive handheld device then establishes data packet 160, including device indicator 162, mode of operation indicator 164, beacon identifications 154, 158, and respective signal strength identification 166, 168.

Once the data packet 160 is broadcast, it is received by a wireless router which relays the data packet 160 as data packet 170 that is received by a server. The server analyzes the data packet and determines that the interactive handheld device is proximate to the set-top box 1 as the signal strength associated with received data packet of set-top box 1 is strongest. The server then sends out signal 172, which includes the device identification 162, the location as represented by a set-top box and the mode of operation for appropriate action.

Figure 6B:
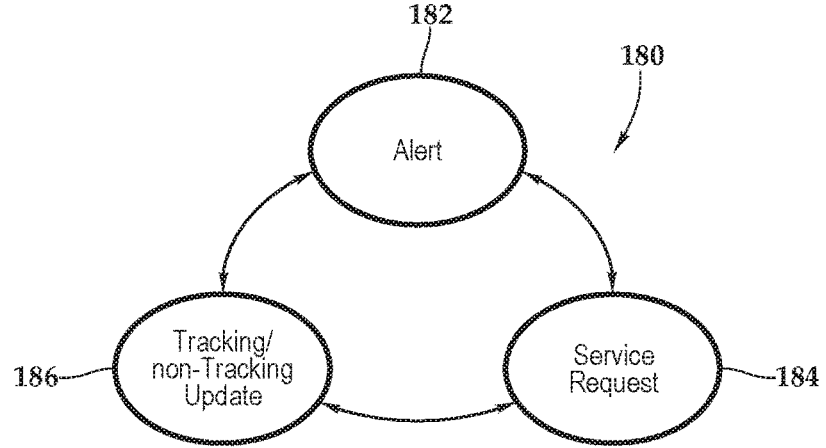
FIG. 6B is state diagram depicting one embodiment of the states of the system presented in FIG. 1A.

FIG. 6B depicts one embodiment of a state diagram 180 of the states of the system 10, which include an alert mode of operation 182, a service request mode of operation 184, and a tracking/non-tracking update mode of operation 186. As will be appreciated, the modes of operation may overlap or, to a partial or full extent be combined. In the alert mode of operation 182, a user of a wireless-enabled interactive device may send an alert to indicate distress. In the service request mode of operation, the user may send a service along with the location information. The tracking/non-tracking update mode indicates the level of privacy the user expects and how much of the location history will be saved.

Figure 7:
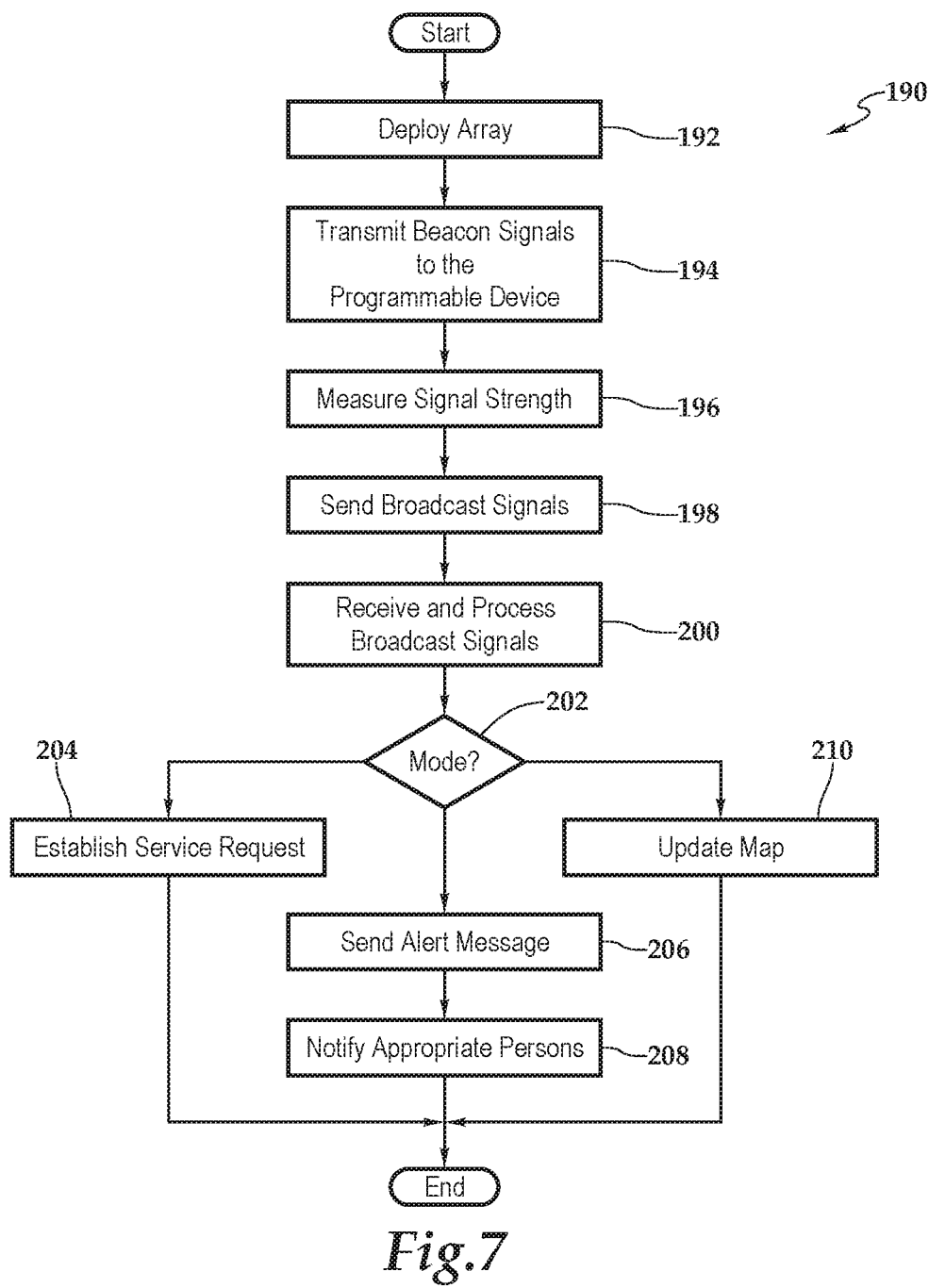
FIG. 7 is a flow chart depicting one embodiment of a method for providing awareness in a hospitality environment according to the teachings presented herein.

FIG. 7 depicts one embodiment of a method 190 for providing awareness in a hospitality environment, according to the teachings presented herein. At block 192, the array of set-top boxes and common area beacons is deployed vertically and horizontally throughout the hospitality environment. At block 194, beacon signals are periodically transmitted from the set-top boxes and common area beacons to be received by the wireless-enabled interactive devices.

At block 196, the signal strength between the beacon transmission of the set-top boxes and the common area beacons at the wireless-enabled interactive programmable device is measured. At block 198, the wireless-enabled interactive programmable device broadcasts data packets, including the beacon identifications and associated signal strengths. At block 200, via the wireless routers, the server receives and processes the data packets. At decision block 202, the server takes action based on the mode of operation. In a first mode of operation at block 204, a service request is associated with the location of the user utilizing the location of the wireless-enabled interactive programmable device as a proxy. In a second mode of operation at block 206, an emergency alert is sent and subsequent notification (block 210) occurs. The emergency alert includes an indication of distress and the location of the user utilizing the location of the wireless-enabled interactive programmable device as a proxy. In a third mode of operation at block 210, the map of individuals is updated with the location of the user with, if privacy settings being enabled, the system maintains the privacy of the individual working in the hospitality environment such that the system only retains in memory the last known position and time of the user-supplied wireless-enabled smart and interactive handheld device. Further, in this mode of operation, the system does not reveal the location of the individual and programmable device unless and until an alert is issued.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for providing awareness in an environment, the system comprising:
    a built environment;
    a spatial array of set-top boxes, each set-top box being associated with a room in the built environment, each set-top box having an identification including a room identifier;
    each set-top box of the spatial array including:
        a housing;
        a wireless transceiver associated with the housing, the wireless transceiver configured to send a beacon to communicate with a proximate wireless-enabled interactive handheld device;
        a processor coupled to the wireless transceiver; and
        a memory accessible to the processor, the memory including processor-executable instructions that, when executed, cause the processor to:
            periodically transmit an identification beacon signal including set-top box identification;
    a data packet associated with the proximate wireless-enabled interactive device, the data packet including at least one set-top box identification, a corresponding signal strength identification indicating the strength of the set-top box identification beacon signal, and a proximate wireless-enabled interactive device identification;
    a spatial array of wireless routers disposed in the environment, each wireless router configured to receive the data packet from the proximate wireless-enabled interactive device and forward the data packet;
    a server located within the built environment and in communication with the spatial array of wireless routers; and
    the location of the proximate wireless-enabled interactive device being determined following communication from the spatial array of set-top boxes to the proximate wireless-enabled interactive device to the spatial array of wireless routers to the server.

2. The system as recited in claim 1, wherein the wireless transceiver is configured to communicate with a standard selected from the group consisting of infrared (IR), 802.11, 3G, 4G, Edge, WiFi, ZigBee, near field communications (NFC), Bluetooth and Bluetooth low energy.

3. The system as recited in claim 1, wherein the wireless routers are configured to communicate with a standard selected from the group consisting of infrared (IR), 802.11, 3G, 4G, Edge, WiFi, ZigBee, near field communications (NFC), Bluetooth and Bluetooth low energy.

4. The system as recited in claim 1, wherein the proximate wireless-enabled programmable device further comprises a user-supplied wireless-enabled smart and interactive handheld device.

5. The system as recited in claim 1, wherein the proximate wireless-enabled programmable device further comprises a single button personal locator device.

6. The system as recited claim 1, wherein the system further comprises an operational mode selected from the group consisting of alerts-enabled, service request-enabled, tracking-enabled, and non-tracking-enabled.

7. The system as recited in claim 1, wherein the spatial array of set-top boxes further comprises a plurality of common space beacon devices, each common space beacon device having an identification including a common space.

8. The system as recited in claim 1, wherein each of the common space beacon devices further comprises:
a processor coupled to a wireless transceiver; and
a memory accessible to the processor, the memory including processor-executable instructions that, when executed, cause the processor to:
periodically transmit an identification beacon signal including beacon device identification.

9. The system as recited in claim 1, wherein the spatial array of set-top boxes comprises a vertical and horizontal array of set-top boxes.

10. The system as recited in claim 1, wherein the spatial array of set-top boxes comprises a horizontal array of set-top boxes.

11. A system for providing awareness in an environment, the system comprising:
a built environment;
a spatial array of set-top boxes, each set-top box being associated with a room in the built environment, each set-top box having an identification including a room identifier;
each set-top box of the spatial array including:
a housing;
a wireless transceiver associated with the housing, the wireless transceiver configured to send a beacon to communicate with a proximate wireless-enabled interactive handheld device;
a processor coupled to the wireless transceiver; and
a memory accessible to the processor, the memory including processor-executable instructions that, when executed, cause the processor to:
periodically transmit an identification beacon signal including set-top box identification;
a data packet associated with the proximate wireless-enabled interactive device, the data packet including at least one set-top box identification, a corresponding signal strength identification indicating the strength of the set-top box identification beacon signal, and a proximate wireless-enabled interactive device identification;
a server located within the built environment and configured to receive the data packet from the proximate wireless-enabled interactive device; and
the location of the proximate wireless-enabled interactive device being determined following communication from the spatial array of set-top boxes to the proximate wireless-enabled interactive device to the server.

12. The system as recited in claim 11, wherein the wireless transceiver is configured to communicate with a standard selected from the group consisting of infrared (IR), 802.11, 3G, 4G, Edge, WiFi, ZigBee, near field communications (NFC), Bluetooth and Bluetooth low energy.

13. The system as recited in claim 11, wherein the proximate wireless-enabled programmable device further comprises a user-supplied wireless-enabled smart and interactive handheld device.

14. The system as recited in claim 11, wherein the proximate wireless-enabled programmable device further comprises a single button personal locator device.

15. The system as recited claim 11, wherein the system further comprises an operational mode selected from the group consisting of alerts-enabled, service request-enabled, tracking-enabled, and non-tracking-enabled.

16. The system as recited in claim 11, wherein the spatial array of set-top boxes further comprises a plurality of common space beacon devices, each common space beacon device having an identification including a common space.

17. The system as recited in claim 16, wherein each of the common space beacon devices further comprises:
a processor coupled to a wireless transceiver; and
a memory accessible to the processor, the memory including processor-executable instructions that, when executed, cause the processor to:
periodically transmit an identification beacon signal including beacon device identification.

18. The system as recited in claim 11, wherein the spatial array of set-top boxes comprises a vertical and horizontal array of set-top boxes.

19. The system as recited in claim 11, wherein the spatial array of set-top boxes comprises a horizontal array of set-top boxes.

20. A system for providing awareness in an environment, the system comprising:
a built environment;
a spatial array of set-top boxes, each set-top box being associated with a room in the built environment, each set-top box having an identification including a room identifier;
each set-top box of the spatial array including:
a housing;
a wireless transceiver associated with the housing, the wireless transceiver configured to send a beacon to communicate with a proximate wireless-enabled interactive handheld device;
a processor coupled to the wireless transceiver; and
a memory accessible to the processor, the memory including processor-executable instructions that, when executed, cause the processor to:
periodically transmit an identification beacon signal including set-top box identification;
a data packet associated with the proximate wireless-enabled interactive device, the data packet including at least one set-top box identification, and a proximate wireless-enabled interactive device identification;
a spatial array of wireless routers disposed in the environment, each wireless router configured to receive the data packet from the proximate wireless-enabled interactive device and forward the data packet;
a server located within the built environment and in communication with the spatial array of wireless routers;
the location of the proximate wireless-enabled interactive device being determined following communication from the spatial array of set-top boxes to the proximate wireless-enabled interactive device to the spatial array of wireless routers to the server.

* * * * *